3,374,261
PREPARATION OF CYCLODODECYL HYDROGEN SULPHATE AND SALTS OF CYCLODODECYL HYDROGEN SULPHATE

Bonnie C. Lloyd, Pasadena, Tex., and Charles G. McAlister, Lake Charles, La., assignors to Columbian Carbon Company, New York, N.Y., a corporation of Delaware
No Drawing. Filed Jan. 29, 1965, Ser. No. 429,119
6 Claims. (Cl. 260—457)

ABSTRACT OF THE DISCLOSURE

Cyclododecyl hydrogen sulphate is prepared by reacting cyclododecene with cold concentrated sulphuric acid, diluting the reaction mixture with cold water, warming the aqueous mixture and adding a hydrocarbon solvent, separating the hydrocarbon phase and evaporating the hydrocarbon solvent to precipitate the acid sulphate. Salts of cyclododecyl hydrogen sulphate are precipitated from the separated hydrocarbon extract by neutralization with an alkali. These salts and the acid sulphate are separately converted to cyclododenol by dilute acid hydrolysis or to dodecane dioic acid by oxidation with concentrated nitric acid.

---

This invention relates to novel organic compounds and processes for their preparation and use. More particularly, it relates to the preparation and use of a novel alkyl hydrogen sulfate and its salts.

The formation of alcohols by the acid hydrolysis of aliphatic olefins, employing sulfuric acid in "concentration-dilution" type operations, is well-known in the art. Lower alkyl acid sulfates are not isolated since their solubility in even dilute sulfuric acid, together with their thermal instability, make isolation difficult and economically unattractive. With higher olefins, the "concentration-dilution" process for producing alcohols is not used since such reactions are subject to competing reactions, particularly polymerization and isomerization, resulting in the formation of complex products. For example, in the "concentration-dilution" hydration of cyclododecene to cyclodecanol, the alcohol product isolated is contaminated by substantial amounts of unconverted hydrocarbon, polymer, and some alkane sulfonic acids. Expensive purification procedures are required to isolate the cyclododecanol in good purity. Furthermore, the cyclododecene-sulfuric acid reaction mixture must be extensively diluted with partial neutralization of the acid, making acid recovery very expensive.

It is an object of the present invention, therefore, to provide novel alkyl hydrogen sulfate compounds and methods for their preparation and isolation.

It is another object of this invention to provide a method for the preparation and isolation of alkyl hydrogen sulfate compounds having high purity.

It is a further object of this invention to provide an improved method for preparing cyclododecanol.

With these and other objects in view, the invention is described herein, and the novel features thereof are pointed out in the appended claims.

In one embodiment, the present invention relates to a novel alkyl hydrogen sulfate, namely cyclododecyl hydrogen sulfate, having the formula $C_{12}H_{23}$—$OSO_2$—$OH$. This compound reacts readily, even in non-aqueous systems, with a wide variety of alkali and alkaline earth metal compounds, including oxides, hydroxides, carbonates, and halides, as well as with ammonium hydroxide. The sodium, potassium, and ammonium salts of cyclododecyl hydogen sulfate are of prnicipal interest as intermediates in the manufacture of high purity cyclododecanol and cyclododecanone. These salts also exhibit some degree of detergent properties. Cyclododecyl hydrogen sulfate and its salts are also useful in preparing dodecanedioic acid by means or nitric acid oxidation.

Cyclododecyl hydrogen sulfate may be prepared and isolated by first contacting concentrated sulfuric acid with cyclododecene followed by dilution with water. An inert hydrocarbon solvent is then added to the reactoin mixture, which is subsequently allowed to settle and separate into phases. The clear and nearly colorless lower sulfuric acid phase is removed and discarded. This acid phase may be used, in commercial operation, by refortifying and recycling, or otherwise reclaiming, the sulfuric acid.

The hydrocarbon extract is evaporated at a low temperature under reduced pressure, causing cyclododecyl hydrogen sulfate to precipitate as hygroscopic crystals.

The sulfuric acid employed in the present invention should have a concentration within the range of about 80%–100%. The cyclododecene is added while the sulfuric acid is maintained at a temperature within the range of from about $-20°$ to about $25°$ C.

In place of cyclododecene, a partially hydrogenated 1, 5, 9-cyclododecatriene substantially free of dienes and trienes may be employed. After all of the olefin has been added, stirring is preferably continued for an additional 5–10 minutes while maintaining the temperature within the above-indicated range prior to the addition of water.

The cooling of the reaction mixture is continued during the slow addition of water. During the final portion of the water addition, the temperature of the reaction mixture is allowed to rise slowly to a temperature not exceeding about $40°$ C.

Any suitable inert liquid solvent may then be added to the reaction mixture maintained at about $40°$ C. Examples of suitable solvents include hexane, cyclohexane, heptane, benzene, toluene, and the like. The extraction of the diluted cyclododecene-sulfuric acid solution is accomplished at temperatures below $80°$ C., preferably from about $30°$ to about $60°$ C.

As indicated above, cyclododecyl hydrogen sulfate reacts readily with various alkali and alkaline earth metal compounds and with ammonium hydroxides to form the corresponding cyclododecyl hydrogen sulfate salts. These salts can also be formed directly without the prior isolation of cyclododecyl hydrogen sulfate by treating the solvent-alkyl hydrogen sulfate solution with an alkali or alkaline earth metal salt, such as an oxide, hydroxide or carbonate, or with ammonium hydroxide. The corresponding salt of cyclododecyl acid sulfate precipitates in the cold and may be recovered by filtration. Substantially all of the polymer materials formed in the reaction of cyclododecene and sulfuric acid is removed in the hydrocarbon solvent solution.

The sodium, potassium, and ammonium salts of cyclododecyl hydrogen sulfate are especially useful intermediates in the manufacture of high purity cyclododecanol and cyclododecanone. For this purpose, the cyclododecyl acid sulfate salt is suspended in 1–2 N sulfuric acid and heated at $80°$–$100°$ C. with agitation until the pH of the aqueous phase reaches a constant value. Upon settling and even before the mixture has cooled, an organic phase separates that can be recovered as a liquid. If the mixture is allowed to cool before removing the liquid formed, the liquid consisting essentially of an alcohol may be recovered by simple decantation or by filtration. Cyclododecanol obtained in this manner has been found to have a purity in excess of 95%. The product cyclododecanol is a suitable feedstock, without further purification, for nitric acid oxidation to dodecanedioic acid. It can also be used, without further purification, for conversion to cyclododecanone by catalytic dehydrogenation means well-known in the art, as for example hydrogen transfer reactions employing a nickel catalyst. The cyclododecanol can, likewise, be further purified by distillation if greater purity is required in other applications.

In the preparation of cyclododecyl hydrogen sulfate, hydrocarbon value not isolated as the acid sulfate can also be isolated as other useful products. After all of the crystalline cyclododecyl acid sulfate has been obtained by evaporation of the mother liquor, the residue is composed principally of solvent, acid sulfate, hydrocarbon polymer and cyclododecane. The remaining acid sulfate value can be recovered as a salt of an alkali or alkaline earth metal by treatment with low-cost bases, such as sodium carbonate or lime.

The method disclosed in the present invention for preparing and isolating cyclododecyl acid sulfate salts for subsequent conversion to cyclododecanol results in a substantial saving in sulfuric acid costs compared to conventional "concentration-dilution" olefin hydration processes in which cyclododecanol is produced directly from cyclododecene. The method of the present invention results in a cyclododecanol product that, as previously noted, is sufficiently pure for use in many applications without any further purification processes. In the conversion of the recovered cyclododecyl acid sulfate salt to cyclododecanol, it is possible to employ the spent dilute sulfuric acid from the initial extraction step, providing a further advantage in the method recited herein.

So that those skilled in the art may better understand the present invention, the following examples are set forth for purposes of illustration, and it should be understood that they are not to be construed as limiting this invention in any manner.

Example 1

166 grams (1 mole) of cyclododecene are added dropwise to 294 grams (3 moles) of vigorously stirred 96% sulfuric acid maintained at a temperature of about −5° to −10° C. After all of the cyclododecene has been added, the reaction mixture is stirred for an additional 5–10 minutes while maintaining the temperature within the indicated range. At the end of that time, 115 grams (6.4 moles) of water are slowly dropped into the reaction mixture with continued cooling. Near the end of this water addition, the temperature is allowed to rise slowly to about 40° C. While the mixture is maintained at about 40° C., an equal volume of benzene is added to the reaction mixture. After stirring vigorously for a brief period, the mixture is then allowed to settle and separate into phases. The lower, clear and nearly colorless sulfuric acid phase is removed and discarded.

The benzene extract is washed with cold water to remove residual sulfuric acid. The solvent is then removed from the extract by evaporation at 10°–20° C. under reduced pressure. As the benzene is evaporated from the solution, cyclododecyl hydrogen sulfate is seen to precipitate. This acid sulfate product, which is collected by filtration, decomposes upon melting at 81.5°–82.5° C. A yield of about 65% of theory, based on cyclododecene charged, is obtained.

Example 2

166 grams (1 mole) of cyclododecene is added dropwise to 294 grams (3 moles) of vigorously stirred 85% sulfuric acid maintained at a temperature of between about −5° and 5° C. Upon completion of the addition of cyclododecene, stirring of the reaction mixture is continued for an additional 5 minutes. Water is then added drop-wise to the reaction mixture with continued cooling, so as to dilute the original sulfuric acid charge to about 70%. During the final portion of the water addition, the temperature of the reaction mixture is allowed to rise slowly to about 30° C. At that temperature, a quantity of toluene approximately equal to the volume of the reaction mixture is added with stirring to extract the diluted cyclododecene-sulfuric acid solution. The temperature of the reaction mixture during this extraction is about 40° C. The aqueous acid lower phase is then removed from the toluene-alkyl hydrogen sulfate-polymer solution that separates as a deeply purple-colored upper phase.

The toluene-alkyl sulfate solution is then treated with 85 grams (0.8 mole) of sodium carbonate. The sodium salt of cyclododecyl acid sulfate precipitates and is recovered by filtration.

Example 3

The process of Example 2 is repeated employing a 96% sulfuric acid maintained at −10° to −20° C. Sufficient water is added to dilute the original sulfuric acid charged to about 75%. During the final part of the water addition, the temperature of the reaction mixture is allowed to rise slowly to about 35° C. An equal volume of benzene is then added to extract the diluted cyclododecene-sulfuric acid solution at an extraction temperature of about 60° C. After the reaction mixture has been stirred vigorously for a brief period, the mixture is allowed to settle and separate into phases. The aqueous acid lower phase is then removed from the benzene-alkyl hydrogen sulfate-polymer solution which separates as a deeply purple-colored upper phase.

The benzene-alkyl sulfate solution is then treated with 74 grams (1 mole) of calcium hydroxide. The calcium salt of cyclododecyl acid sulfate precipitates and is recovered from the benzene solution by filtration. Substantially all of the polymeric material formed in the reaction of cyclododecene and sulfuric acid is retained in the benzene solution.

Example 4

The process of Example 3 is repeated employing 35 grams (1 mole) of ammonium hydroxide. The ammonium salt of cyclododecyl acid sulfate precipitates and is recovered by filtration.

Example 5

The process of Example 2 is repeated employing 196.2 grams (2 moles) of 80% sulfuric acid maintained at a temperature of 10° to 15° C. After all of the 166 grams (1 mole) of cyclododecene has been added and the stirring continued for an additional ten minutes at the above-indicated temperature, 130 grams (8.1 moles) of water are added with continued cooling of the reaction mixture. Near the end of the water addition, the temperature of the reaction mixture is allowed to rise to about 40° C. Toluene is then added with stirring in a quantity approximately equal to the volume of the reaction mixture. The reaction mixture is stirred to extract the diluted cyclododecene-sulfuric acid solution at a temperature of about 75° C. The aqueous sulfuric acid lower phase is removed from the toluene-alkyl hydrogen sulfate-polymer solution that separates as a deeply purple-colored phase.

The toluene-alkyl sulfate solution is then treated with 70 grams (0.7 mole) of calcined potash. The potassium salt of cyclododecyl acid sulfate precipitates and is recovered by filtration. Substantially all of the polymeric material formed in the reaction of cyclododecene and sulfuric acid is removed in the toluene solution.

Example 6

93 grams (0.5 mole) of the sodium salt of cyclododecyl acid sulfate is suspended in 500 ml. of 2 N sulfuric acid and heated at about 90° C. with agitation until the pH of the aqueous phase remains constant. After the reaction mixture has been allowed to cool, the alcohol product is recovered by simple decantation. The product obtained in this manner is found to be cyclododecanol having a purity in excess of 95%.

Example 7

The process of Example 6 is repeated employing 121 grams (0.6 mole) of the potassium salt of cyclododecyl acid sulfate. The alcohol product is found to be cyclododecanol having a purity of about 96%.

Example 8

The process of Example 6 is repeated employing 145 grams (0.8 mole) of the ammonium salt of cyclododecyl acid sulfate. Cyclododecanol is obtained as a liquid product that is separated from the reaction mixture by decantation and recovered in a purity of about 95%.

Example 9

164 grams (1 mole) of cyclododecyl hydrogen sulfate are reacted with 139 grams (2.2 moles) of concentrated nitric acid to form an acid product identified by analysis as dodecanedioic acid.

Example 10

The process of Example 9 is repeated employing 167 grams (0.9 mole) of the sodium salt of cyclododecyl hydrogen sulfate. The acid product formed is identified by analysis as dodecanedioic acid.

Example 11

The process of Example 9 is repeated employing 199 grams (1.1 moles) of the ammonium salt of cyclododecyl hydrogen sulfate. The acid product obtained is identified by analysis as dodecanedoic acid.

It will be understod that various changes and modifications in the details herein described in order to explain the nature of the invention may be made by those skilled in the art within the principle and scope of the invention as expressed in the appended claims.

We claim:

1. The method of preparing and isolating cyclododecyl hydrogen sulfate comprising:
   (A) adding cyclododecene slowly to a vigorously stirred concentrated sulfuric acid maintained at a temperature within the range of from about −20° C. to about 25° C.;
   (B) adding water slowly, with continued cooling, to the reaction mixture so as to dilute the sulfuric acid charge to within the range of about 50% to 85%, the temperature of the reaction mixture being allowed to rise slowly near the end of the water addition to a temperature not exceeding about 40° C.;
   (C) adding an inert liquid solvent to the reaction mixture and stirring vigorously for a brief period of time;
   (D) allowing the reaction mixture to settle and separate into phases and removing the lower sulfuric acid phase;
   (E) removing the solvent from the hydrocarbon extract phase by evaporation under reduced pressure, thereby causing the cyclododecyl hydrogen sulfate to precipitate;
   (F) recovering said cyclododecyl hydrogen sulfate from the residue of the hydrocarbon extract phase.

2. The method of claim 1 and including the continued stirring of the reaction mixture for an additional 5 to 10 minutes after all of the cyclododecene has been added, while maintaining the temperature of the reaction mixture within the range of from about −20° C. to about 25° C.

3. The method of claim 1 and including the washing of the hydrocarbon extract with cold water to remove residual sulfuric acid prior to removing the solvent by evaporation.

4. The method of preparing and isolating alkali or alkaline earth metal or ammonium salts of cyclododecyl acid sulfate comprising:
   (A) adding cyclododecene slowly to vigorously stirred concentrated sulfuric acid maintained at a temperature within the range of from about −20° C. to about 25° C.;
   (B) adding water slowly, with continued stirring, so as to dilute the sulfuric acid charge to within the range of from about 50% to about 85%, while allowing the temperature to rise slowly near the end of the water addition to about 40° C.;
   (C) adding an inert liquid solvent to the reaction mixture and stirring vigorously for a brief period to extract the diluted cyclododecene-sulfuric acid solution;
   (D) allowing the reaction mixture to settle and separate into phases, the hydrocarbon solvent-alkyl hydrogen sulfate solution separating as the upper phase and removing the lower sulfuric acid phase;
   (E) treating said hydrocarbon solvent-alkyl hydrogen sulfate solution with an alkali or alkaline earth metal or ammonium salt, thereby precipitating the corresponding alkali or alkaline earth metal or ammonium salt of cyclododecyl acid sulfate;
   (F) recovering said salt of cyclododecyl acid sulfate from the residue of the hydrocarbon extract phase.

5. The method of claim 4 in which the solvent-alkyl sulfate solution is treated with an alkaline earth metal salt, thereby forming the corersponding alkaline metal salt of cyclododecyl acid sulfate.

6. The method of claim 4 in which the solvent-alkyl sulfate solution is treated with ammonium hydroxide, thereby forming the ammonium salt of cyclododecyl acid sulfate.

References Cited

UNITED STATES PATENTS

| | | | |
|---|---|---|---|
| 2,174,131 | 9/1939 | Lubs | 260—457 |
| 2,504,517 | 3/1946 | Greene | 260—631 |
| 3,121,728 | 2/1964 | Bartlett | 260—617 |

CHARLES B. PARKER, *Primary Examiner.*

B. BILLAIN, L. C. MARUZO, *Assistant Examiners.*